United States Patent [19]

Matsuno et al.

[11] 4,259,627
[45] Mar. 31, 1981

[54] NUMERICALLY CONTROLLED TRANSFER MACHINE

[75] Inventors: Takeshi Matsuno; Takeshi Kobayashi, both of Narashino, Japan

[73] Assignee: Seiko Seiki Kabushiki Kaisha, Chiba, Japan

[21] Appl. No.: 864,272

[22] Filed: Dec. 27, 1977

[30] Foreign Application Priority Data

Jan. 7, 1977 [JP] Japan .................................. 52/571

[51] Int. Cl.$^3$ ............................................ G05B 19/29
[52] U.S. Cl. .................................... 318/600; 318/601; 318/603; 318/626; 318/466; 318/470; 408/71
[58] Field of Search ............... 318/600, 626, 652, 672, 318/466, 470, 603, 601; 29/38 C; 408/71; 90/15.1 R

[56] References Cited

U.S. PATENT DOCUMENTS

| | | | |
|---|---|---|---|
| 2,341,135 | 2/1944 | Baird | 318/470 |
| 2,842,985 | 7/1958 | Grover | 408/71 |
| 3,571,686 | 3/1971 | Henegar | 318/672 |
| 3,714,537 | 1/1973 | Bur | 318/626 |
| 3,890,057 | 6/1975 | Kindelan | 408/71 |
| 4,023,084 | 5/1977 | Owa | 318/603 |

FOREIGN PATENT DOCUMENTS 2419876  3/1975  Fed. Rep. of Germany ........... 318/626

Primary Examiner—Gene Z. Rubinson
Assistant Examiner—Eugene S. Indyk
Attorney, Agent, or Firm—Robert E. Burns; Emmanuel J. Lobato; Bruce L. Adams

[57] ABSTRACT

A numerically controlled transfer machine comprises a rotary index table having thereon a plurality of jig tables for holding workpieces, and a plurality of working units are disposed in spaced relation around the index table so that rotary indexing of the index table successively positions the jig tables opposite different ones of the working units. Each working unit includes a positioning feed mechanism for controlling the feeding and return movements of the working unit to enable a working operation to be carried out on the workpieces. Each working unit has a position detector comprised of a microswitch mounted on a slide member slidably mounted on the working unit. A biasing spring urges the slide member in the direction of return movement of the working unit and a stopper comes into contact with and actuates the microswitch during the course of return movement to thereby feed an origin reference signal to the positioning feed mechanism to effect positioning of the working unit at a preselected origin return position. In the event of continued return movement past the origin return position, the stopper comes into contact with and pushes the slide member against the force of the biasing spring thereby preventing damage to the microswitch.

5 Claims, 6 Drawing Figures

| | 16a | 16b | 16c | 16d | 16e | 16f | 16g | 16h |
|---|---|---|---|---|---|---|---|---|
| $15_1$ | 1 | 2 | Y | + | 00135 | 5 | 1 | 1 |
| $15_2$ | 2 | 1 | Z | + | 00350 | 8 | 1 | 2 |
| $15_3$ | 3 | 3 | X | + | 00713 | 7 | 1 | 0 |
| $15_4$ | 4 | 6 | Y | + | 00146 | 6 | 1 | 0 |

← (a)
(b) →

NUMERICALLY CONTROLLED TRANSFER MACHINE

BACKGROUND OF THE INVENTION

The present invention relates generally to a transfer machine having a plurality of working units for applying individual working to respective workpieces, and more particularly to a numerically controlled transfer machine of a type that the working feed operation of each of the working units is automatically controlled according to numerical-input data.

In the transfer machine of prior art construction, the working feed operation of each of the working units has been controlled by a cam mechanism. Therefore, the number of processes of a working trace is restricted, because it is difficult to complicate the configuration of the cam. In a tooling change, much labor is required to design the cam calculated from the working trace, exchange the cam, fabricate the cam and obtain accuracy, so that the conventional machine is not suitable for a little working of various workpieces.

The present invention overcomes the above-pointed disadvantages and provides a numerically controlled transfer machine in such manner that the working feed operation of the respective working units is driven directly by a pulse motor and the like, in addition, a numerically control mechanism is equipped, so that automatic order, feed direction, feed speed, feed amount of the working unit are automatically controlled on the basis of the numerical data programmed in advance on a digital switch or tape and the like.

BRIEF DESCRIPTION OF DRAWINGS

The drawings show a numerically controlled transfer machine of the present invention.

Referring to the accompanied drawings, embodiments of the present invention will be explained in detail hereinbelow.

Figure 1:
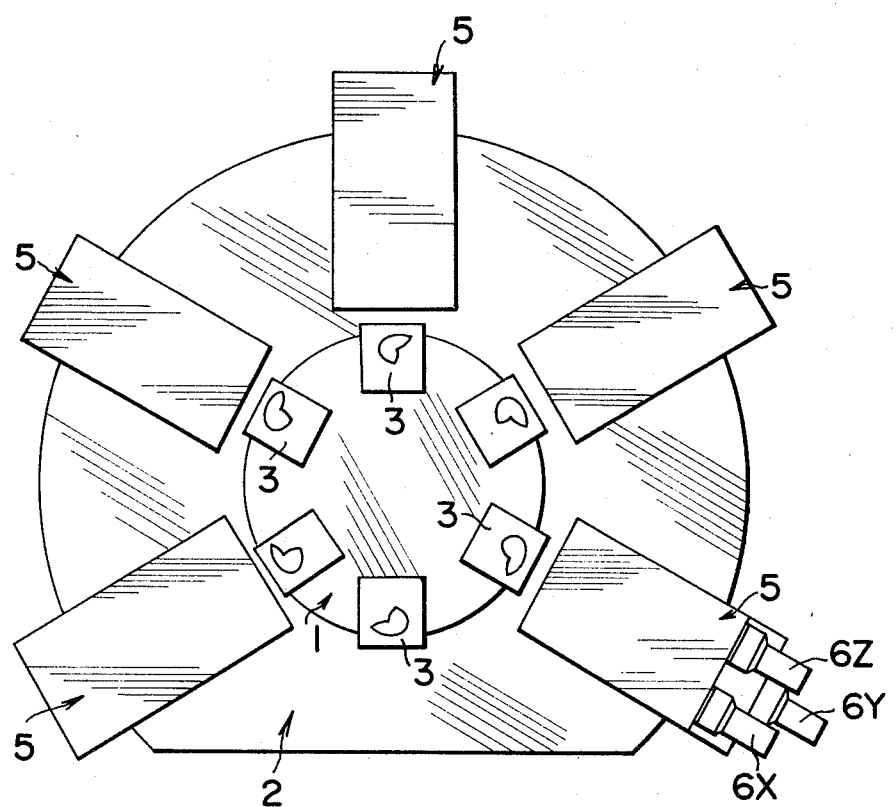
FIG. 1 is a plan view showing an outline of the construction of the machine in accordance with the present invention.

FIG. 1 shows an outline of the mechanical construction of a transfer machine in accordance with the present invention. A reference numeral 1 shows a rotary type index table mounted at a center portion of a fixed table 2. On a circumference of the index table, jig tables 3, 3 . . . are mounted for holding workpieces which correspond in number to the number of working stations. This index table 1 is controlled by an index control unit 4 (refer to FIG. 2) and adapted to be indexingly rotated to each working station. 5, 5 are working units which carry out various type workings such as a drill unit or a milling unit. These working units 5, 5 are arranged on the fixed table 2 so as to correspond to each working station around the index table. The respective working units 5, 5 have a mechanism for applying feeding movements of multi-dimensions such as leftward and rightward (X-axis) and upward and downward (Z-axis) and the like to a working head. Pulse motors 6X, 6Y and 6Z, one for each of the respective axes, are provided as the driving source of this feeding movement mechanism. The pulse motors 6X, 6Y, and 6Z are controlled by working control units 7, 7 respectively provided at each working unit 5 (refer to FIG. 2) to be operated.

Figure 2:
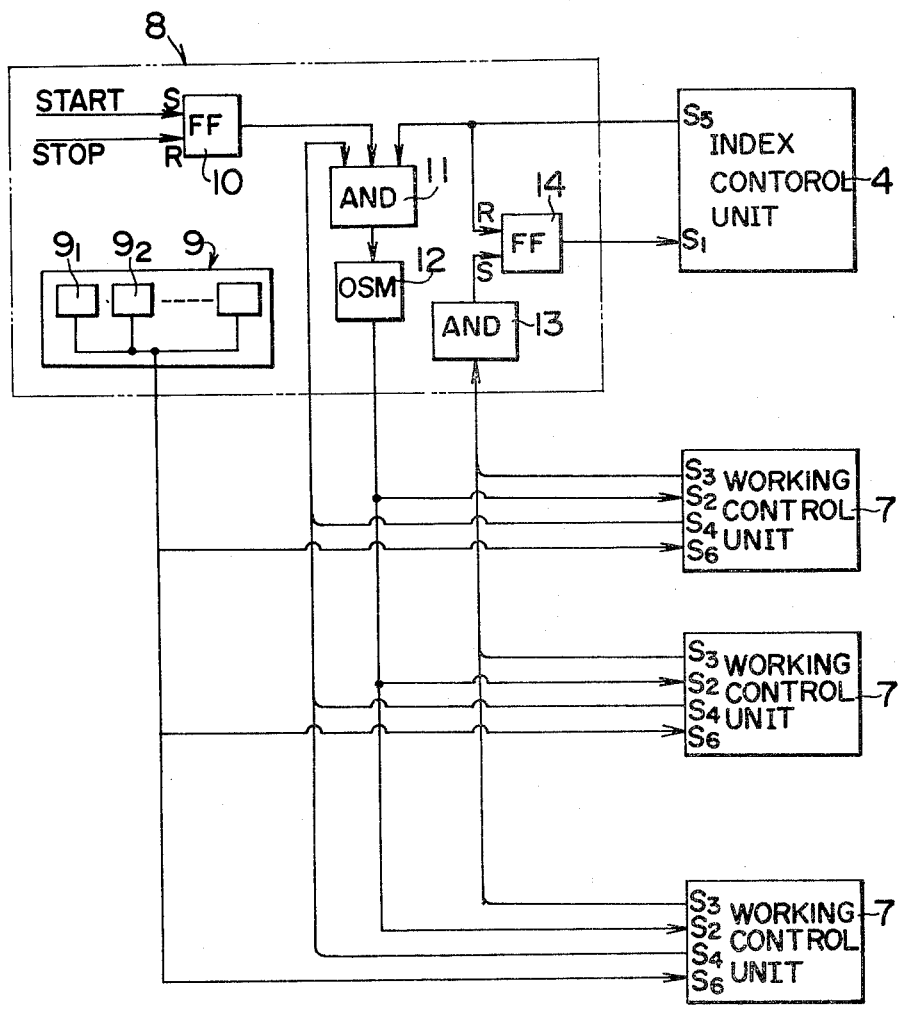
FIG. 2 is a block diagram of the control system of the invention.

FIG. 2 is a block diagram showing the entire control system of a transfer machine in accordance with the present invention. In the same figure, 8 designates a center control unit. The center control unit 8 has a function for feeding an index start signal $S_1$ to the index control unit 4 and working start signals $S_2$, $S_2$ . . . to the respectively above-mentioned working control units, 7, 7 . . . in a below-mentioned condition. Further, the above-said transfer machine is provided with a speed setting unit 9 having a plurality of feed speed setting devices $9_1$, $9_2$ . . . which set signals sending the command of the feed speed to the working units 5, 5.

While a working finishing signal $S_3$ is fed from the afore-mentioned working control unit 7 when a series of working cycles (described hereinbelow) has been completed, a unit fixed position signal $S_4$ is given when the working head of the working unit 5 returns to a fixed position and these signals are fed to the center control unit 8. A table fixed position signal $S_5$ is applied from the above-said index control unit 4 when an index cycle is completed and the index table 1 reaches the fixed position, and this signal is fed to the center control unit 8.

In the center control unit 8, a START signal is fed to a set input terminal of a flip-flop circuit 10 (referred to as simply FF 10 hereinafter) and set thereto, an output signal is applied from a set output terminal thereof to an AND gate circuit 11 (referred to hereafter as AND 11). If at this time, all of the unit fixed position signals $S_4$, $S_4$, . . . and the table fixed signal $S_5$ are applied to the other input terminal of the AND 11, an output signal is given from the AND 11 and in response to the signal, an one-shot multivibrator 12 (refer to OSM 12 hereinafter) is actuated. A pulse output signal from the OSM 12 is fed to the respective working control units 7, 7 . . . as a working start signal $S_2$.

In response to the working start signal $S_2$, the operation of the working cycle of the working units 5, 5 . . . are commenced respectively as mentioned below. When the working cycle of the working units 5, 5 . . . is finished, working finish signals $S_3$, $S_3$ . . . are fed out from the working control units 7, 7 . . . respectively. When all the working finish signals $S_3$, $S_3$, . . . are applied to the AND gate circuit 13 (referred to as AND 13) of the center control unit 8, a flip-flop circuit 14 (referred to as FF 14 hereinafter) is set in response to an output signal from the AND circuit 13 and an output signal fed from the set output terminal is applied as an index start signal $S_1$ to the index control unit 4.

In response to the index start signal $S_1$, the index cycle of the index table 1 is commenced. When the index cycle has been finished and the table fixed position signal $S_5$ is fed out, the FF 14 is reset. Further, when the respective working units 5, 5 . . . are all returned to their fixed positions, all the unit fixed position signals $S_4$, $S_4$ . . . are fed out. When a set output signal of the FF 10 is applied to the AND 11 in the above-described condition, the afore-mentioned operations are repeated again. If a STOP signal is fed to the FF 10 and it is reset, the above-described operations stop.

Figure 3:
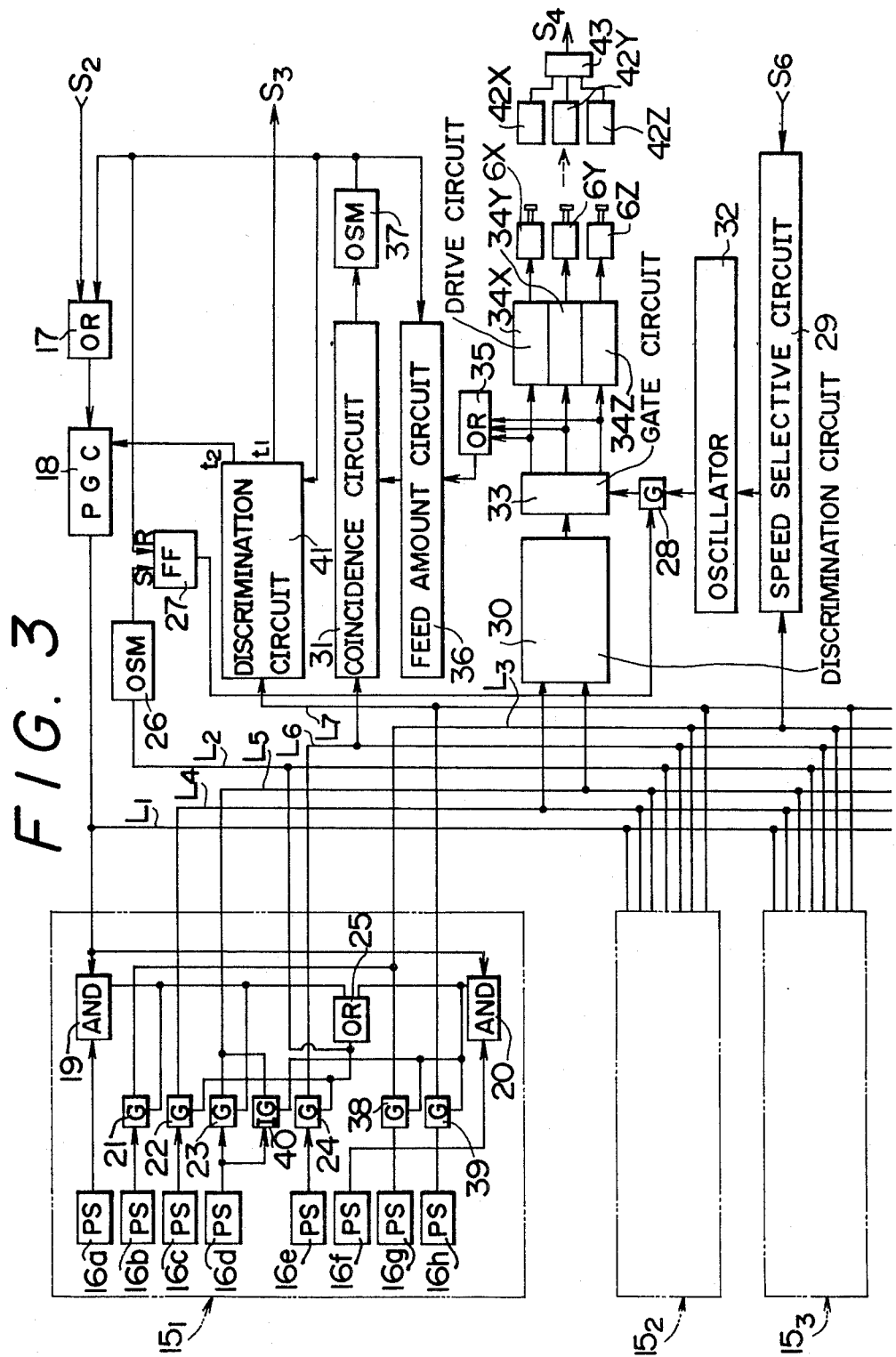
FIG. 3 is a block diagram showing in detail a working control unit of the type shown in FIG. 2.

FIG. 3 is a block diagram of a working control unit 7 corresponding to one working unit 5. In the above figure, $15_1$, $15_2$ ... are respectively program portions for controlling each working process of a series of working cycles. Each program portion $15_1$, $15_2$ ... respectively has digital type program switches 16a to 16h (referred to as PS 16a to PS 16h hereinafter) for presetting each working step to be carried out in one process.

A PS 16a is a switch for ordering the operation sequence of a workpiece feed process. A PS 16b is a switch for ordering a feed speed of the workpiece feed speed. A PS 16c is a switch for indicating a feed axis from among the X, Y and Z axes. A PS 16d is a switch for ordering feed direction to select either one of + and −. A PS 16e is a switch for ordering feed amount. A PS 16f is a switch for ordering the sequence of the operation. A PS 16g is a switch for ordering return speed of the return stroke. A PS 16h is a switch for ordering a below-mentioned control mode together with the return operation.

Figures 4, 5:
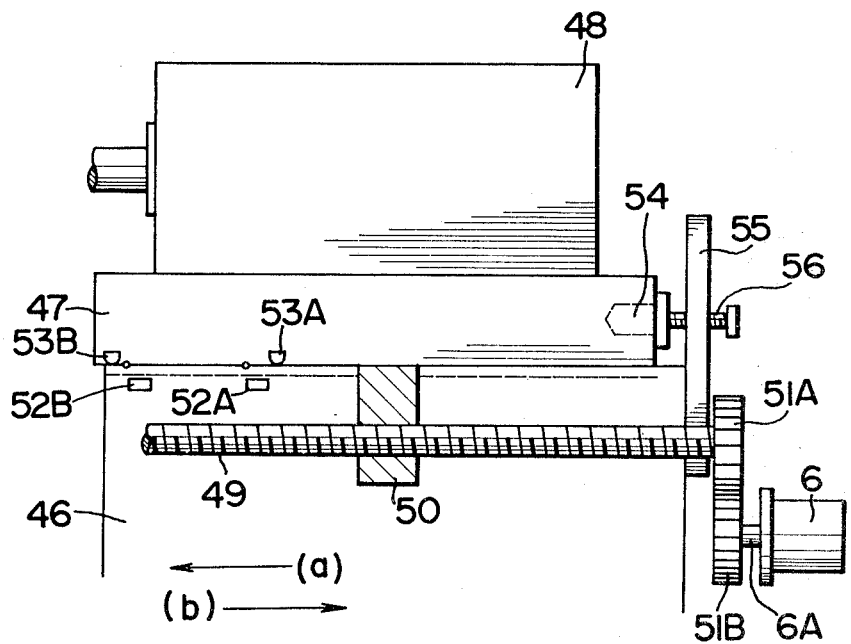
FIG. 4 is an explanatory view showing an example of a program for one cycle to be set in a working control unit of the machine.
FIG. 5 is an explanatory view showing in diagramatic form an embodiment of an origin positioning device.

FIG. 4 shows a sample of the control contents for one cycle obtained from a certain working trace programmed in the PS 16a to the PS 16h of the aforedescribed program portions $15_1$ to $15_4$. For example in the program portion $15_1$, at the PS 16b, feed speed "2" is set, at the PS 16c, the feed axis "X" is set, at the PS 16d, the feed direction "-" is set, and at the PS 16e, the feed amount "135", respectively, whereby the operation of the working feed for one fifth of the process of the working unit 5 may be ordered and at the PS 16a, the sequence of the operation "1" is set in order to carry out the feed operation as a first process. Further, at the program portion $15_1$, the sequence of the operation "5" is set in order to carry out a process for returning the amount fed in the first process to an original position as a fifth process. At the PS 16g, the speed "1" of the return stroke is set. "0" of the PS 16h for ordering the control mode means non-control. "1" means the feed of the working finish signal $S_2$. "2" means resetting the working control unit 7 to an original position.

Referring to FIG. 3 the operation of the working control unit 7 will be explained in order hereinbelow.

When the working start signal $S_2$ is fed out from the center control unit 8, this signal $S_2$ is applied to a program counter 18 (referred to as PGC 18) through an OR gate circuit 17 (referred to as OR 17) and advances the PGC 18 to "1". (It is understood that before starting, the PGC is reset to "0".)

Output "1" of the PGC 18 is fed to the respective program portions $15_1$, $15_2$ ... from a line $L_1$. At each of the program portions $15_1$, $15_2$ ..., the output "1" is compared with an operation sequence order signal of the PS 16a at an AND gate circuit 19 (referred to as AND 19) and also an operation sequence order signal of the PS 16f at an AND gate circuit 20 (referred to as AND 20).

If the programs shown in FIG. 4 are set to each of the program portions $15_1$ to $15_4$, "1" set to the PS 16a of the program portion 15, coincides with output of the PGC 18, and a coincidence signal is fed out from the AND 19. The coincidence output opens the gate circuits 22, 24 (referred to as G 22, G 24) through an OR gate circuit 25 (referred to as OR 25). Further, the coincidence output is also applied to an oneshot multivibrator 26 (referred to as OSM 26 herein-below) through a line $L_2$. A pulse output fed from the OSM 26 is applied to a set input terminal of the flip-flop circuit 27 (referred to as FF 27) and sets it. A set output of the FF 27 opens a gate circuit 28 (referred to as G 28).

In the program portion $15_i$, the opening of $G_{21}$, $G_{22}$, $G_{23}$ and $G_{24}$ permits a speed indicating signal set to the PS 16b to be fed to a speed selective circuit 29 through a line $L_3$. A feed axis order signal set to the PS 16c and a feed direction order signal set to the PS 16d are respectively applied to a discrimination circuit 30 through a line $L_4$, $L_5$ and determine either one of the above-said pulse motors 6X to 6Z and the rotary direction thereof. The feed amount order signal set to the PS 16e is applied to a coincidence circuit 31 through a line $L_6$, which becomes the control information of a first process.

To the other input terminal of the speed selective circuit 29, a speed setting signal $S_6$ set by a speed setters $9_1$, $9_2$ ... of the above-described feed speed setting unit 9 is given. One of these speed setting signals commanded by the speed order signal is fed to an oscillator 32 from the speed selective circuit 29 as a speed control signal.

This oscillator 32 feeds an operation signal for controlling operation of the above-mentioned pulse motors 6X to 6Z. The oscillating frequency thereof is determined by the speed control signal and an oscillating output thereof is fed to a gate circuit 33 through the opened G28.

The gate circuit 33 synchronizes an output of the discrimination circuit 30 with a signal of an oscillating output of the discrimination circuit 30 and is applied to either one of pulse motor drive circuits 34X, 34Y and 34Z.

For example, when the feed axis order signal "Y" and the feed direction signal "+" are applied to the discrimination circuit 30, an output of the discrimination circuit 30 becomes +Y and passes the gate circuit 33 and is applied to the drive circuit 34Y. A driving signal amplified in the drive circuit 34Y is fed to the pulse motor 6Y. The pulse motor 6Y rotates clockwise at speed "2" and feed the working head of the working unit 5 rightwards on the Y axis.

Simultaneously, a driving signal from the gate circuit 33 passes across the OR gate circuit 35 (referred to as OR 35 hereinbelow) and is applied to a feed amount counter 36 by which said signal is counted. A counted output from the feed amount counter 36 is given to the other input terminal of the coincidence circuit 31.

In the coincidence circuit 31, said counted output is compared with the feed amount order signal from the PS 16e. When the counted output coincides with the feed amount order signal, an one shot multivibrator 37 (referred to as OSM 37 hereinafter) is actuated and from the OSM 37, a coincidence signal is fed out.

This signal resets the FF 27 and closes the G 28, resulting in that the driving signal from the oscillator 32 is intercepted to be applied and the pulse motor 6Y (6X, 6Z) is stopped. At the same time, the coincidence signal resets the feed amount counter 36 to "0" and also advances the PGC 18 to "2" through the OR 17.

A first process is completed by the above-mentioned operation. In the program portion $15_1$, an output of the AND 19 is lost, thereby the G 21 to G 24 being closed.

In the program shown in FIG. 4, an operational sequence order signal "2" set to the PS 16a coincides with a count output "2" of the PGC 18 at the program portion $15_2$ and a coincidence signal is fed out from the AND 19, so that the G 21 to G 24 open and a feed operation of a second process is carried out in accordance with the information set to the PS 16$b$ to 16$e$ of the program portion 15$_2$.

In the same manner, a third process and a fourth process are carried out. When a count output of the PGC is "5", the count output "5" and an operational sequence order signal "5" set to the PS 16$f$ of the program portion 15 coincide with each other. Then in the program portion 15$_1$, a coincidence signal is fed from the AND 20. The coincidence signal opens gate circuits 38, 39 (referred to as G 38, G 39 hereinafter) and a mark inversion gate circuit 40 (referred to as IG 40), also G 22 and G 24 through the OR 25 and G 28 through the OSM 26 and the FF 27 from the line L$_2$.

The opening of G 22 allows the set feed axis order signal "Y" set to the PS 16$c$ to be fed to the discrimination circuit 30 through the line L$_4$. Opening of IG 40 permits a mark of the feed direction order signal to be inverted into "—" and the mark inverted signal is applied to the discrimination circuit through the line L$_5$. The feed amount order signal "135" set to the PS 16$e$ is applied to the coincidence circuit 31 through a line L$_6$ when the G 24 is opened. When the G38 opens, a speed order signal "1" set to the PS 16$g$ is given to the speed selective circuit 29 through the line L$_3$. Further, when the G39 opens, a control mode order signal "1" set to the PS 16$h$ is fed to a discrimination circuit 41 through a line L$_7$.

According to the above-mentioned information, the control equal to the above explanation is done. The pulse motor 6Y is inverted. The working head of the working unit 5 is returned in a negative direction on the Y axis to "135", or for feed of the first process.

The control mode order signal "1" is discriminated in the discrimination circuit 41. When a coincidence signal is given to this discrimination circuit 41 through the OSM 37 from the coincidence circuit 31, an output is generated at an output terminal t$_1$ corresponding to the control mode signal "1" and this output signal is applied to the center control unit 8 as the above-described working finish signal S$_3$. The working finish signal indicates that the working head and the like of the working unit 5 is returned to a position where it does not interfere with indexing operation of the index table 1. As mentioned above, when working finish signals S$_8$ are given from all the working units 7, 7 . . . , the index operation is commenced.

Similarly, a sixth process and a seventh process are carried out. When the eighth process is completed; the working head of the working unit 5 is returned to a fixed position. The reset of the working head to the fixed position is detected by position detectors 42X, 42Y and 42Z. Detecting signals thereof are fed to the center control unit 8 through an AND gate 43 as the unit fixed position signal S$_4$.

As shown in FIG. 4, to the PS 16$h$ of the program portion 15$_2$ to which the program of the eighth process is set, a control mode order signal "2" is set. When a predetermined amount of return stroke of the eighth process is finished, a coincidence signal is fed from the above-mentioned coincidence circuit 31 through the OSM 37. As the coincidence signal which is applied to the discrimination circuit 41 which produces an output signal at an output terminal t$_2$ corresponding to the control mode order signal "2". By the output signal, the PGC 18 is reset to "0". Thus, the working control unit 7 is also returned to an initial condition.

In this manner, one cycle operation of a pair of the working control units 7 and the working unit 5 is carried out. Such operation is performed by each of the working control units 7, 7 . . . in parallel with each of the working units 5, 5 . . . . When unit fixed position signals S$_4$, S$_4$ . . . are given from all the working control units 7, 7 . . . and table fixed position signal S$_5$ from the index control unit 4, the machine of the invention completes its one cycle-operation, which indicates all parts being reset to their initial condition.

Figure 6:
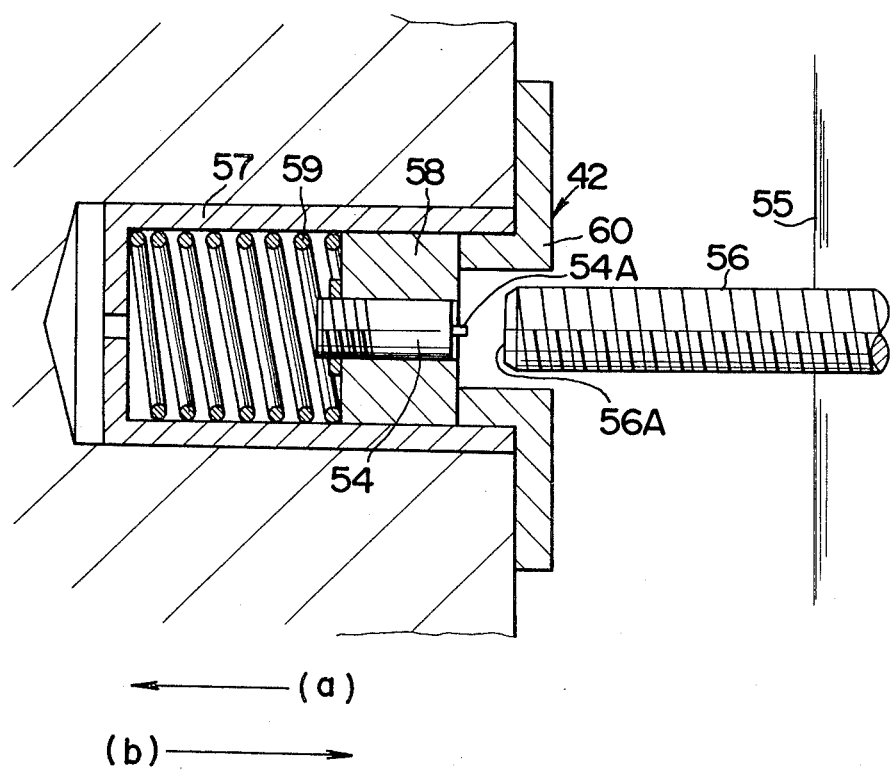
FIG. 6 is a sectional view of a position detector.

When the working head of the working unit 5 is returned to a fixed position during the control operation, a control position of the working head is undesirably sheared unless a return origin position thereof is constantly fixedly maintained. Furthermore, the repetition of the working cycle causes this error and thereby aggravated to be accumulated. According to the present invention, in order to maintain the origin position with high accuracy, a position detector 42 is constructed as shown in FIGS. 5 and 6. FIG. 5 shows an origin positioning device provided with an axis feed movement mechanism. In the same figure, a reference numeral 46 designates a base of the working unit 5. On an upper surface of the base 46, a slide member 47 is mounted for sliding movement in directions shown by arrows (a) and (b) through a dovetail guide or the like. On an upper surface of the slide member 47, a working head 48 is mounted for applying a working operation to a workpiece on the afore-mentioned jig table 3.

49 is a feed screw rotatably and traversely disposed at a lower surface portion of the base 46. To this feed screw 49, a nut 50 protrudedly attached to a lower surface of the slide member 47 is threaded. To an end portion of the feed screw 49, a gear 51A is secured.

To the base 46, the pulse motor 6 is fixed. To a driving shaft 6A thereof, a gear 51B engages with a gear 51A. When the pulse motor 6 is rotated clockwise or counter-clockwise, the feed screw 49 is rotated clockwise or counter-clockwise through the gears 51A, 51B, thereby causing the slide member 47 together with the working head 48 to slide in directions (a) or (b). 52A designates a microswitch attached to a predetermined position of the base 46. 53A shows a dog secured to a predetermined position of the slide member 47 in order to actuate the microswitch 52A. The microswitch 52A feeds a moderation signal at a predetermined position during the return of the slide member 47 and retards the return speed of the slide 47.

52B is a microswitch secured to a predetermined position of the base 46. 53B is a dog attached to a predetermined position of the slide member 47 so as to actuate the microswitch 52B. In the event the slide member 47 does not stop at a predetermined origin position during the return of the slide member 47, this micro-switch 52B becomes a safety device constructed so as to contact the dog 53B and feed an overtravel signal to stop the slide member 47 again. A detection switch 54 of the position detector 42 is attached to a rear end portion of the slide member 47. The position detection switch 54 is operated by means of a stopper 56 secured to the base 46 through a supporter 55.

FIG. 6 shows a detail of the position detector 42. 57 is a solid hollow member secured in an opening of the slide member 47. 58 is a slide member slidably inserted into the hollow inner portion of the solid member 57. The slide member 58 is constantly pressed with respect to an opening frame 60 provided at an opening side of the slide member 58 through a spring 59.

The above described position detection switch 54 comprises of a highly accurate metal contact switch attached to the slide member 58. By pushing or depressing an operating element 54A of the switch 54, switch contacts in an inner portion thereof are opened. During the slide returning motion, the slide member 47 retracts, resulting in that the stopper 56 enters a center opening of the opening frame 60, an end portion 56A of the stopper contacts the operating element 54A and a top reference signal is given from the highly accurate metal contact 54.

The stopper 56 is connected with the supporter 55 by means of a screw. When the slide member 47 reaches a position slightly ahead of the origin position, which can be precisely set by adjusting the axially position of the stopper, an origin reference signal is adapted to be fed from the highly accurate metal contact switch 54.

When all the working processes mentioned above are finished and the working head 48 is returned in the direction shown of arrow (b) and the microswitch 52A attached to a predetermined position of the base 46 contacts the dog 53A attached to the slide member 47, the microswitch 52A feeds a moderation signal which changes over the return speed of the slide into low speed rotation and retards the return speed of the slide member 47.

When the speed retarded slide member 47 retracts further in the direction of arrow (b), the stopper 56 enters the center opening 60A of the position detector 42 and contacts the operating element 54A, whereupon an origin reference signal is fed out from the highly-accurate metal contact switch 54. In the above-mentioned working control unit 7, in response to the origin reference signal, the number of a driving pulse of the pulse motor is counted. When the number reaches a predetermined fixed number, the motor is stopped. When the slide member 47 is returned to a position slightly ahead of the origin position (which is detected by the highly accurate position detector 42), the member 47 stops precisely at the origin position.

If the slide member 47 does not stop at the predetermined origin position due to any failure during the return of the slide, the stopper 56 contacts an end surface of the slide member, presses and advances the slide member 58 rearwards against the force of the spring 59. Then, the dog 53B attached to the slide member 47 contacts the microswitch 52B provided on the base 46, whereupon the slide member 47 is stopped by a signal fed from the microswitch 52B.

In the above-described embodiment, as a control information input means, a comparably simple digital switch is used. It is understood that the present invention is not limited thereto but the invention may be constructed in such manner that the control information is programmed in a punched tape or a magnetic tape and the information read, processed and discriminated by an operation system and fed to each of the control units.

In the afore-mentioned embodiment, the respective feed motors of multi-dimensions are adapted to be driven in order by a motor driving control system. Providing driving control systems corresponding to the feed motors enables multi-dimensional simultaneous feed to be done.

As explained above, the transfer machine in accordance with the present invention controls the feed operation of each working unit on the basis of previously programmed numerical information. Therefore, such drawbacks as the working trace being influenced by the complicated configuration of a cam in the conventional index machine which controls the feed operation of the respective working unit has been effectively overcome. Furthermore, in the present invention, the working trace may be set at will and modified simply by making or modifying a program. Also, positioning of the unit can be performed accurately by modifying the program.

As for tooling change, a high technique such as the conventional design, fabrication, installation, accuracy and the like of cam is not required and only modification of the program enables the ready change of tools. Accordingly, the machine of the invention having substantially equal design satisfies various demands of a number of users. Additionally, since a high sensitive switch for detecting an origin return position is energized by means of a resilient means so as to resist against the stopper, accuracy of the origin position can be kept for a long time without breakage or loss of accuracy of the high sensitive switch.

We claim:

1. In a numerically controlled transfer machine of the type having a plurality of movable working units each including a positioning feed mechanism for controlling the feeding and return movements of its corresponding working unit; and a rotary index table having mounted thereon a plurality of jig tables for holding workpieces and operable in response to rotary indexing movement to successively position said jig tables at working stations opposite respective ones of said working units: a plurality of detecting means each coacting with an associated one of said working units for detecting when said working unit reaches a predetermined position during its course of return movement and providing an origin reference signal in response to such detection and applying the origin reference signal to the corresponding positioning feed mechanism to effect return positioning of said working unit to a preselected origin return position in readiness for the next feeding movement, each said detecting means including means for enabling movement thereof relative to its associated working unit after detection of said predetermined position to thereby prevent damage to said detecting means in the event of continued return movement of said working unit past said preselected origin return position.

2. In a numerically controlled transfer machine according to claim 1; wherein said means for enabling movement of each detecting means relative to its associated working unit comprises means mounting said detecting means on said working unit for movement relative thereto, resilient biasing means biasing said detecting means in the direction of return movement of said working unit, and a stopper mounted in the path of travel of said detecting means during return movement thereof for contacting said detecting means and moving the same against the biasing action of said resilient biasing means in the event of continued return movement of said working unit past said preselected origin return position.

3. In a numerically controlled transfer machine according to claim 2; wherein each detecting means comprises a microswitch mounted on a slide member and actuatable to provide said origin reference signal, means mounting said slide member for sliding movement on said working unit, and wherein said resilient biasing means biases said slide member in the direction of return movement of said working unit such that said stopper contacts and actuates said microswitch when said working unit reaches said predetermined position during the course of its return movement and upon continued return movement of said working unit past said preselected return position said stopper contacts and moves said slide member against the biasing action of said resilient biasing means thereby preventing damage to said microswitch.

4. In a numerically controlled transfer machine according to claim 3; wherein said stopper comprises a threaded stopper threaded into a fixed member thereby enabling change of said preselected origin return position by changing the extent said threaded stopper is threaded into said fixed member.

5. In a numerically controlled transfer machine according to claim 2; further including means operable independently of said plurality of detecting means for effecting stoppage of the return movement of each working unit in the event the working unit continues return movement past its preselected origin return position.

* * * * *